United States Patent [19]

Heller et al.

[11] 4,072,002
[45] Feb. 7, 1978

[54] ROTARY SEVERING MECHANISM FOR A ROW CROP HEADER

[75] Inventors: Larry E. Heller, New Holland; Joe E. Shriver, East Earl; Curtis H. Lindblom, New Holland, all of Pa.

[73] Assignee: Sperry Rand Corporation, New Holland, Pa.

[21] Appl. No.: 713,469

[22] Filed: Aug. 11, 1976

[51] Int. Cl.² .............................................. A01D 45/02
[52] U.S. Cl. ........................................................ 56/53
[58] Field of Search ................................... 56/51–119, 56/14.3–14.6

[56] References Cited

U.S. PATENT DOCUMENTS

| 365,821 | 7/1887 | Killingsworth | 56/53 |
|---|---|---|---|
| 1,156,439 | 10/1915 | Smith | 56/60 |
| 1,349,266 | 8/1920 | Cogburn | 56/63 |
| 3,654,751 | 4/1972 | Meharry | 56/56 |
| 3,911,651 | 10/1975 | Schreiber | 56/98 |

*Primary Examiner*—Russell R. Kinsey
*Attorney, Agent, or Firm*—Frank A. Seemar; John B. Mitchell; Joseph A. Brown

[57] ABSTRACT

A forage harvester row crop header having a mobile frame, at least one fore-and-aft extending row crop unit mounted on the frame and including an elongated passageway for receiving a row of crop as the header advances forwardly over a field of crop planted in spaced apart rows is provided with an improved severing mechanism for severing the crop within the passageway and which further insures the severance of grass-like materials within the crop row. The improved severing mechanism includes upper and lower rotary severing discs and a lower rotary guide disc. The upper and lower rotary severing discs are disposed on opposite sides of the elongated passageway and overlap within the passageway in defining a severing zone for severance of crop material. The lower rotary guide disc is mounted to and below the upper severing disc. Upon operation, the guide disc engages grass-like materials within the row crop and orients the same into the severing zone resulting in severance thereof. The improved severing mechanism further includes stripper bars so positioned so as to maintain the severing mechanism free from any build-up of crop material within the severing mechanism which would adversely affect its operation.

4 Claims, 4 Drawing Figures

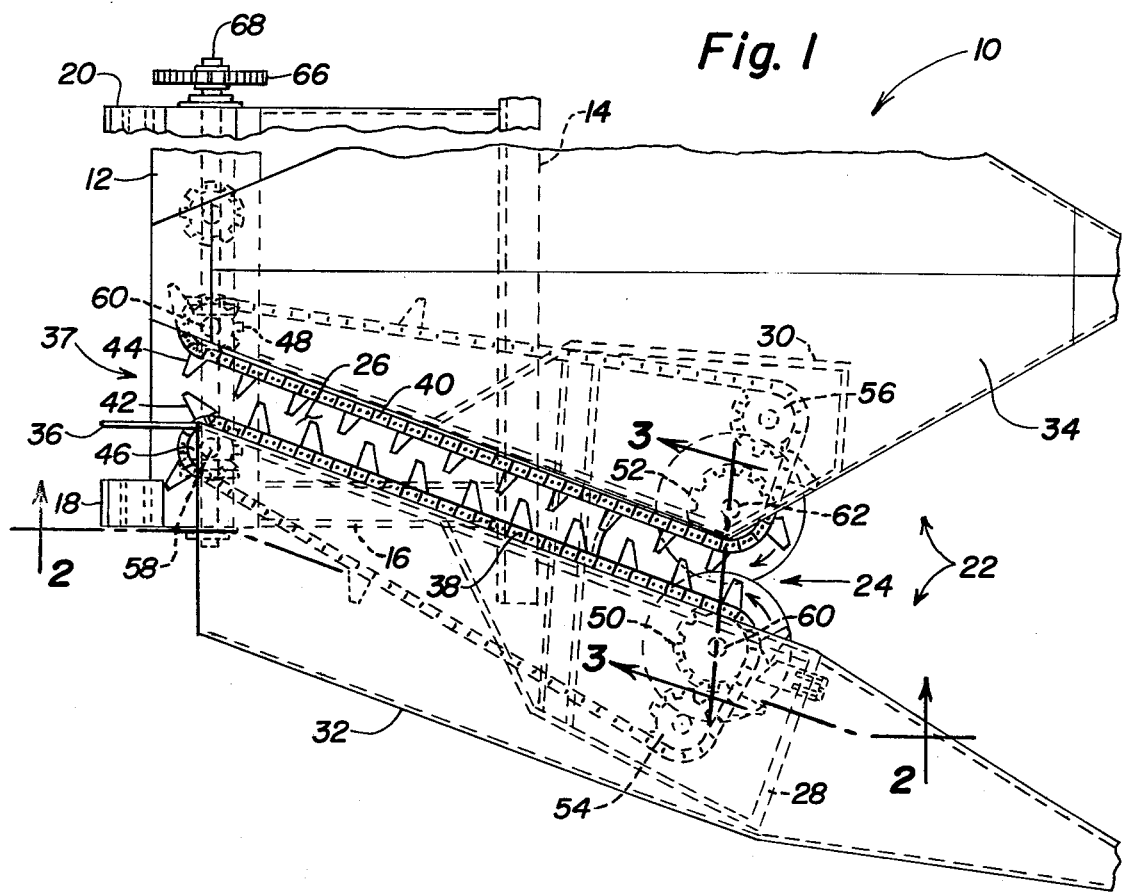
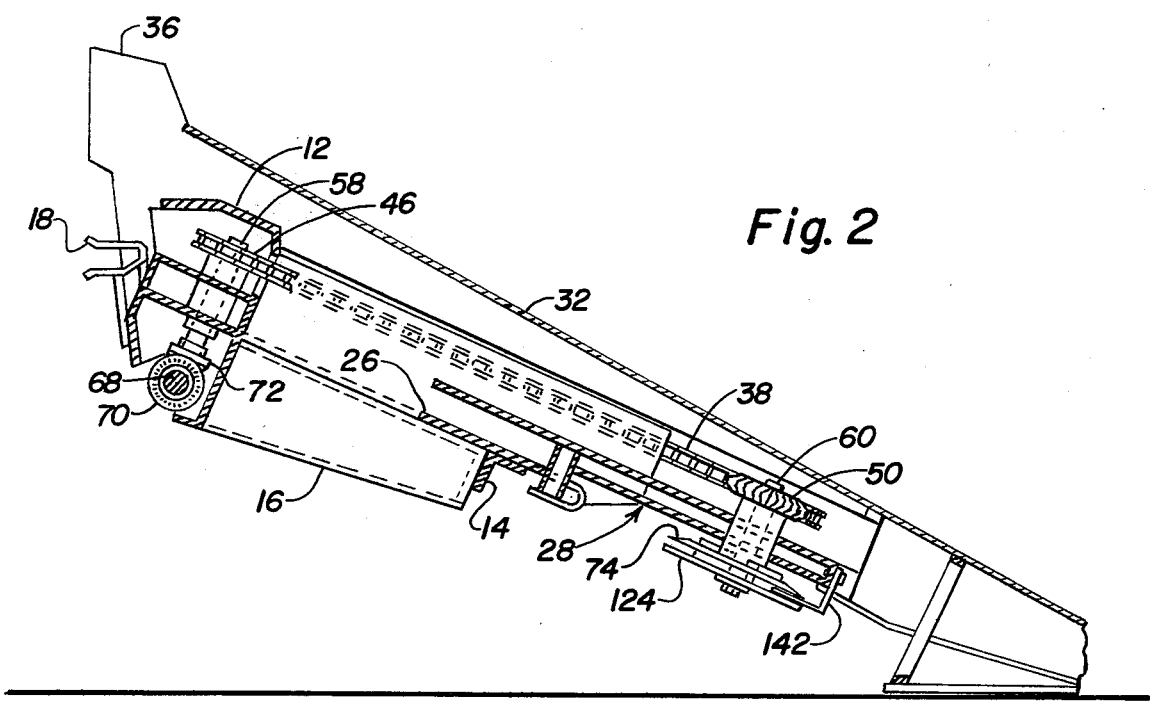

ROTARY SEVERING MECHANISM FOR A ROW CROP HEADER

BACKGROUND OF THE INVENTION

1. Field of the Invention

The present invention relates generally to a row crop header for a forage harvester and, more particularly, is directed to an improved rotary crop severing mechanism for severing the crop as the header advances forwardly over a field of crop planted in spaced apart rows.

2. Description of the Prior Art

A typical forage harvester operating in row planted stalk crops; such as corn, sorghum maize, etc., includes a mobile base unit and a row crop header for gathering the crop from the field. The base unit usually includes a processing mechanism for processing the crop gathered by the header. The header, positioned in front of the processing mechanism, generally includes a plurality of row crop units each having an elongated crop passageway for receiving a respective row of crop, a severing mechanism associated with the passageway of each row unit for severing the stalks a short distance above the ground, and conveying means for conveying the severed crop rearwardly along the passageway to the crop processing mechanism.

Oftentimes during harvest, fine stemmed grasses or grass-like materials are found growing within the rows along with the row crops. These grasses adversely affect the harvest of the row crops in that they tend to wrap around and hair-pin about the operational components of the header causing blockage and damage thereof.

One type of rotary severing mechanism which has been recently employed with the row crop headers includes a pair of upper and lower peripheral overlapping cutting discs that define a severing zone within the passageway for severance of the crop as it enters the passageway. This type of severing mechanism works quite satisfactorily in severing the row crop but does not satisfactorily sever the grasses within the row crop which adversely affects the operation of the header. Some of the grasses tend to slip between the rotary cutting discs and are not severed, the unsevered grasses tending to hair-pin behind the discs interfering with the conveyance of the severed crop stalks rearwardly along the passageway.

SUMMARY OF THE INVENTION

The present invention obviates the problems and disadvantages associated with the prior art rotary severing mechanism by providing an improved severing mechanism for a row crop header which engages the grass-like materials and orients the same into the severing zone, defined by a pair of upper and lower overlapping severing elements, to ensure severance of the grass-like materials along with the severance of the row crop.

Accordingly, the present invention sets forth an improved rotary severing mechanism for a row crop header including at least one fore-and-aft extending row crop unit having an elongated crop passageway for receiving a row of crop as the header advances forwardly over a field of crop planted in rows. More particularly, the improved severing mechanism includes first and second rotatively driven shafts disposed on opposite sides of the elongated crop passageway with first and second severing elements respectively supported on the first and second shafts and extending outwardly therefrom in an overlapping relation in defining a severing zone for the severance of crop within the passageway under conditions wherein the shafts and thus their respective severing elements are predeterminedly counter-rotated. In accordance with the principles of the present invention, a guide element is supported on one of the shafts and spaced vertically from the one of the severing elements being mounted on the one shaft and overlaps with the other of the severing elements for engaging any grass-like materials within the row crop and orientating the same into the severing zone to thereby ensure severance thereof.

Preferably, the first and second severing elements are rotary flat discs with the guide element also being of a disc shape and of a diameter

DETAILED DESCRIPTION OF THE INVENTION

In the following description, right hand and left hand references are determined by standing at the rear of the machine and facing in a direction of forward travel. Also, in the following description, it is to be understood that such terms as "forward," "rearward," "left," "upwardly," etc., are words of convenience and are not to be construed as limiting terms.

IN GENERAL

Referring now to the drawings, and particularly to FIG. 1, there is fragmentarily shown a multi-row crop header, being indicated generally by the numeral 10, incorporating the principles of the present invention. The header 10 is of the type having multi-row crop units adapted to receive a plurality of rows of crop as the unit advances forwardly over a field of crop planted in spaced apart rows.

The header 10 includes a frame having a rear transverse frame member 12, a front transverse frame member 14 and fore-and-aft extending support legs 16 (only one of which being shown) connecting the rear and front transverse frame members 12,14 together to form a rigid structure.

Secured to the rear transverse frame member 12 and projecting outwardly and rearwardly therefrom is a pair of spaced apart conventional mounting brackets 18,20 for attaching the header 10 to the front of a harvesting machine, such as a forage harvester or the like.

Supported on the respective front and rear transverse frame members 12,14 are a plurality of fore-and-aft extending row crop units 22, each of which having an elongated fore-and-aft crop passageway 24 for receiving respective rows of crop as the unit advances. For the sake of convenience and brevity, only one of such row crop units 22 has been illustrated in FIG. 1. Furthermore, since the improvement provided by the present invention is associated with each of the row crop units 22, the description to follow hereinafter of such improvement in relation to the one row crop unit substantially equal to that of the first and second severing discs. Further, preferably, the guide disc is supported on the first shaft below the first severing disc and overlaps with the second severing disc, and is connected to and coaxial with the first severing disc so as to rotate therewith upon rotation of the first shaft.

The improved severing mechanism further includes a stripper mechanism in the form of a first stripper bar supported on the top surface of at least one of the severing discs and a second stripper bar disposed between the top surface of the guide disc and the bottom surface of the first severing disc. The purpose of the stripper mechanism is to prevent any build-up of crop material on the first and second severing discs and between the first severing disc and the guide disc and further to prevent wrappage of the crop material about the first and second shafts.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description, reference will be frequently made to the attached drawings in which:

FIG. 1 is a fragmentary plan view of a row crop header incorporating the improved severing mechanism of the present invention.

FIG. 2 is a side elevation view of the row crop header as taken along section line 2—2 of FIG. 1.

Figure 3:
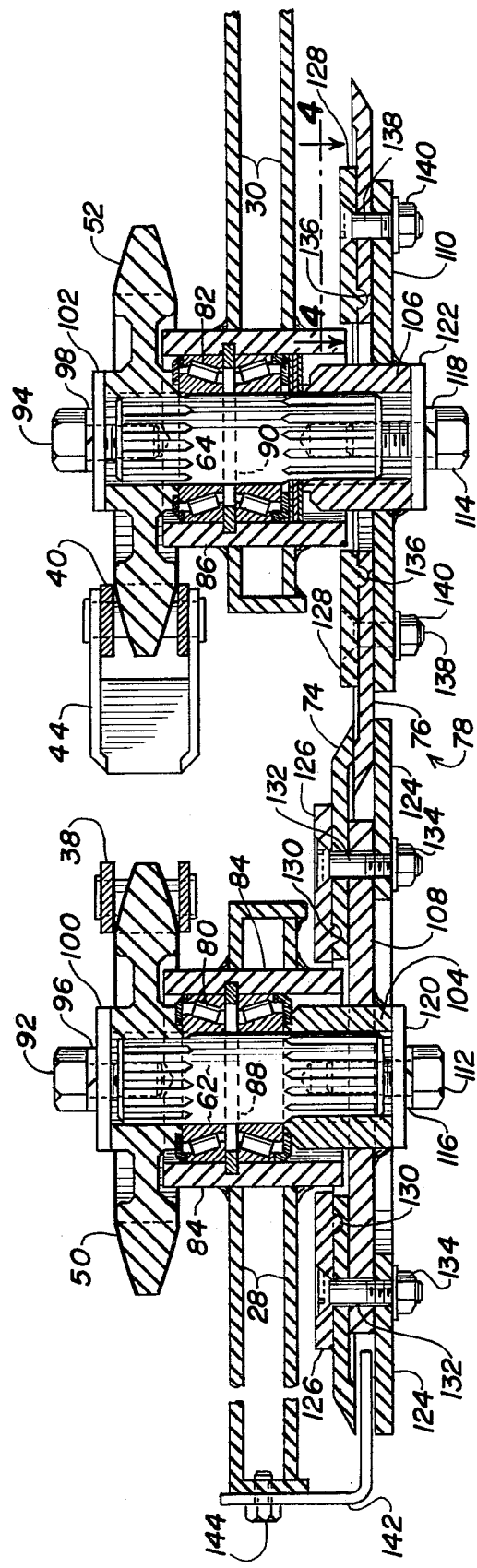
FIG. 3 is an enlarged front elevation view of the improved severing mechanism as seen along section line 3—3 of FIG. 1 with the lower stripper bar rotated 90° to the left so as to more clearly show the structure and arrangement of the components of the severing mechanism.

The row crop unit 22 is of a configuration formed by an elongated channel member 26 with respective outer and inner box-shaped structures 28,30 secured to the forward portion of the inner and outer walls of the channel member 26. The elongated channel member 26 extends generally fore-and-aft and defines the aforementioned passageway 24.

On each side of the passageway 24 formed by channel member 26 are fenders or dividers 32,34 of well known sheet metal fabrication. As best seen in FIG. 1, the outer divider 32 extends generally upwardly and rearwardly from front to rear and has a pointed front portion for moving between adjacent rows of crop as the header 10 advances forwardly over a field. Attached to the inner side of the outboard divider 32 is a throat plate 36 which extends rearwardly therefrom and defines one side of the discharge throat outlet 37 of the header 10. There is a similar throat plate on the other outer divider (not shown) that defines the opposite side of the discharge outlet. The inner divider or fender 34 also has a pointed front portion and forms the center island between adjacenr row units.

Respectively disposed on opposite sides of the passageway 24 is a pair of cooperating butt gripping chains 38,40 having respective lugs 42,44 that project inwardly toward one another. The chains 38,40 are entrained around respective drive sprockets 46,48; driven sprockets 50,52; and idler sprockets 54,56. The drive sprockets 46,48 are mounted on the upper ends of respective shafts 58,60 which are journalled within suitable bearings supported on rear transverse frame member 12. The driven sprockets 50,52 are mounted on the upper ends of respective shafts 60,62 which are supported on respective outer and inner box-shaped structures 28,30 (a more detailed description of the supporting arrangement of the shafts 60,62 will be discussed in conjunction with the discussion of the improved severing mechanism). And the idler sprockets 54,56 are supported within spring biased brackets (not shown) secured to the respective outer and inner box-shaped structures 28,30. The common function of the idler sprockets 54,56 is to take up the slack in respective chains 38,40 and thereby, maintain driving relationships between the chains 38,40 and their respective drive and driven sprockets 46,48 and 50,52.

The drive for the header 10 will now be discussed in reference to FIG. 1 and further in reference to FIG. 2. The power for driving the various operating components of header 10, including the improved severing mechanism to be discussed shortly, is transmitted from the harvesting machine to which header 10 is to be attached through a chain (not shown) entrained around a drive sprocket (not shown) on the harvesting machine and a sprocket 66 supported on the left end of transversely extending drive shaft 68. Drive shaft 68 extends within rear transverse frame member 12 and supports an array of vertical bevel gears 70 which drivably mate with a corresponding array of horizontal bevel gears 72 supported on the lower ends of shafts 58,60 that support drive sprockets 46,48. The drive is such that the chains 38,40 more rearwardly along the elongated passageway 24 and that shafts 62,64, along with driven sprockets 50,52, are predeterminedly counter-rotated in directions as indicated by the arrows in FIG. 1.

IMPROVED ROTARY SEVERING MECHANISM

As the header 10 advances over a field of row planted crops, such as corn or the like, the butt-end of the crop stalks entering the passageway 24 are gripped by the chains 38,40 and are severed a short distance above the ground by the improved severing mechanism of the present invention; preferably the severing of the crop stalks and the gripping of the butt-ends by chains 38,40 occur almost simultaneously.

As best seen in FIG. 3, the improved severing mechanism includes a pair of upper and lower rotary severing elements 74,76 preferably being disc shaped, which overlap within passageway 24 in defining a severing zone 78 in the forward portion of passageway 24 for severing crop material. The cutting discs 74,76 are supported on the lower ends of respective shafts 62,64 by a mounting arrangement to be described as follows.

Shafts 62,64 are journalled for rotation with respective bearings 80,82 housed within respective housing structures 84,86 formed within respective outer and inner box-shaped structures 28,30. The bearings 80,82 are retained within housings 84,86 by snap rings 88,90. The upper ends of shafts 62,64 are externally splined to mate with the internally splined driven sprockets 50,52. Fastening bolts 92,94 extend through lock washers 96,98 and retaining washers 100,102 and are threadedly engaged in threaded bores provided in the upper ends of the respective shafts 62,64. The lower ends of shafts 62,64 are also externally splined for mating with internally splined hub structures having hubs 104,106 and support plates 108,110 respectively secured to the outer peripheries of the hubs 104,106. For fastening the hub structures on the lower ends of respective shafts 62,64 bolts 112,114 are provided with extend through lock washers 116, 118 and retainer washers 120,122 and are threadedly engaged within threaded bores provided in the lower ends of the respective shafts 62,64.

The upper and lower rotary discs 74,76 are each provided with a central bore for inserting the same over respective hubs 104,106 such that the discs 74,76 are supported on the top surface of respective support plates 108,110. Preferably, the discs 74,76 are of equal diameters extending outwardly from shafts 62,64 such that they overlap or register with one another within passageway 24 in thereby defining aforementioned severing zone 78. Further, in the preferred embodiment, discs 74,76 are substantially identical, with their outer peripheral edges being tapered or curved relative to their flat surfaces and with disc 74 being reversely disposed or turned upside down relative to disc 76.

The improved severing mechanism further includes a rotary guide element 124, preferably, coaxial with and spaced below the upper cutting disc 74 and overlapping with the lower cutting disc 76. Preferably, the guide element 124 is also disc shaped having a diameter substantially equal to the diameter of the upper and lower cutting discs 74,76 and is generally parallel thereto. The guide disc 124 is adapted to be attached to the bottom surface of support plate 108 such that it rotates with the support plate 108 and the upper cutting disc 74 upon rotation of shaft 62.

Figure 4:
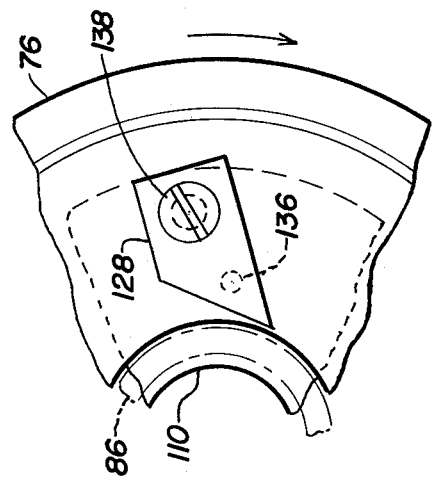
FIG. 4 is a fragmentary plan view of the stripper bar associated with the lower severing element as seen along section line 4—4 of FIG. 3. illustrated in FIG. 1 would have equal application to the other row crop units not shown.

Still further, the improved severing mechanism includes stripper means for maintaining the upper and lower cutting discs 74,76 and the guide disc 124 free from any crop material which may tend to build-up on the severing mechanism during the severance operation. More particularly, as seen in FIGS. 3 and 4, a pair of elongated stripper bars 126 are supported on the top surface of upper cutting disc 74, extending radially outwardly from housing 84, and a similar pair of stripper bars 128 are supported on the top surface of lower cutting disc 76, extending radially outwardly from housing 86. The ends of bars 126,128, adjacent the housings 84,86, are tapered so as to scrape away any crop material that tends to build-up or wrap around the housings 84,86. Bars 126, associated with upper cutting disc 74, are attached thereto by integral bar nipples 130 which seat within indentations provided in the top surface of disc 74 and further by attaching bolts 132 that extend through corresponding holes provided in the stripper bars 126, the upper cutting disc 74, support plate 108 and lower guide disc 124. On the underside of guide disc 124, nuts 134 are threadably secured on bolts 132 to sandwich the aforementioned elements together. Stripper bars 128, associated with disc 76, are similarly attached by integral bar nipples 136 seated within indentations provided in the top surface of lower cutting disc 76 and further by attaching bolts 138 that extend through corresponding holes provided in stripper bars 128, lower cutting disc 76 and support plate 110. Nuts 140 being threadably secured to the lower ends of bolts 138 sandwich the respective elements together.

The above-described mounting assembly is such that shaft 62, stripper bars 126, upper cutting disc 74, support plate 108 and lower guide disc 124 rotate together upon rotation of driven sprocket 50 and that, shaft 64, stripper bars 128, lower cutting disc 76 and support plate 110 rotate together upon rotation of driven sprocket 52.

The aforementioned stripper means further includes a stripper bar 142 for maintaining the area or cavity between the upper cutting disc 74 and lower guide disc 124 free from any crop material buildup. Stripper bar 142 is L-shaped with its vertical leg being attached by bolt 144 to the front edge or face of outer box shaped structure 28 and with its horizontal leg extending between the upper cutting disc 74 and lower guide disc 124.

SEVERING OPERATION

During operation, the row crop header 10 advances forwardly over a field of standing row crops, such as corn, with the dividers 32,34 moving between adjacent rows for guiding and directing the stalks into passageway 24. As the stalks enter passageway 24, chains 38,40 grip the butt ends or lower portions of the stalks as the upper and lower cutting discs 74,76 sever the stalks a short distance above the ground. The severed crop is then moved rearwardly by chains 38,40 along passageway 24 to the rear discharge outlet 37 through which the stalks are fed to a crop processing mechanism located in the base unit of the harvester.

Any grasses or grass-like materials growing within the row crop are engaged by the rotary guide disc 124 which tends to orient the same into the severing zone 78 defined by the upper and lower rotating severing disc 74,76 to thereby insure that the grasses will be severed. Rotary guide disc 124 tends to position the stems of the grass in a generally upright orientation relative to the cutting disc 74,76 wherein the grass stems take on a S-shaped configuration as they pass through the severing zone 78. More specifically, rotary guide disc 124 forces the lower portion of the grass stems over into alignment with the overlapping region of discs 74,76 whereas lower cutting disc 76 forces the intermediate portions of the grass stems into the cavity area between upper disc 74 and guide disc 124 which in turns forces the upper portions of the grass stems to pass between upper and lower cutting discs 74,76 in such a position to insure severence thereof.

Further, during the severing operation, stripper bars 126,128 rotate along with rotating cutting discs 74,76 tending to maintain the areas between the top surfaces of discs 74,76 and the lower surfaces of outer and inner box-shaped structure 28,30 free from any crop material build-up. Stripper bar 142 also operates to maintain the area between the upper cutting disc 74 and lower guide disc 124 free from any crop material build-up.

It is thought that the improved severing mechanism of the present invention and many of its attendant advantages will be understood from the foregoing description and it will be apparent that various changes may be made in form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An improved rotary severing mechanism for a harvesting machine row crop header including at least one row crop unit having at least one elongated crop passageway for receiving a row of crop, said improved severing mechanism comprising:
   (a) first and second rotatably driven shafts disposed on opposite sides of said elongated passageway,
   (b) first and second severing elements respectively supported on said first and second shafts, said first and second severing elements extending outwardly from said respective shafts into said passageway to define a severing zone and being operable to sever crop within said severing zone upon predetermined counter-rotation of said shafts, (c) said first and second severing elements comprising discs having confronting shearing surfaces defined by beveled edge portions disposed for cooperative engagement in said severing zone to sever said crop under conditions where said first and second shafts are counter-rotated, and (d) a flat guide element supported on said first shaft below said first and second element, coaxial with said first element and overlapping with said second severing element for promoting orientation of said crop within said severing zone.

2. The improved severing mechanism, as described in claim 1, wherein said guide element is a disc having a diameter substantially equal to the diameter of said first severing element and said first severing element is disposed above said second severing element.

3. The improved severing mechanism, as described in claim 2, wherein said guide element is attached to said first severing element so as to rotate therewith upon rotation of said first shaft.

4. The improved severing mechanism, as described in claim 2, wherein said first severing element, said second severing element and said guide element all lie in planes substantially parallel to one another.

* * * * *

UNITED STATES PATENT OFFICE
CERTIFICATE OF CORRECTION

Patent No. 4,072,002          Dated  February 7, 1978

Inventor(s) Larry E. Heller et al

It is certified that error appears in the above-identified patent and that said Letters Patent are hereby corrected as shown below:

Column 2, line 59 (beginning at "sub-") through Column 3, line 33 (ending at "Fig. 3.") should be moved to follow the words "disc shape and of a diameter" located in Column 2, line 17.

Column 2, lines 18 through 59 (ending at "row crop unit") should be moved to precede the words "illustrated in Fig. 1" now located in Column 3, line 33.

Signed and Sealed this

Twenty-seventh Day of June 1978

[SEAL]

Attest:

RUTH C. MASON
Attesting Officer

DONALD W. BANNER
Commissioner of Patents and Trademarks